Sept. 28, 1965     M. A. CARLSON ETAL     3,208,758
METAL VACUUM JOINT
Filed Oct. 11, 1961

INVENTORS
MAURICE A. CARLSON
WILLIAM R. WHEELER
BY *Harry E. Aine*
ATTORNEY

United States Patent Office 3,208,758
Patented Sept. 28, 1965

3,208,758
METAL VACUUM JOINT
Maurice A. Carlson, Los Altos, and William R. Wheeler, Saratoga, Calif., assignors to Varian Associates, Palo Alto, Calif., a corporation of California
Filed Oct. 11, 1961, Ser. No. 144,458
3 Claims. (Cl. 277—171)

This invention relates to vacuum joints, and, more particularly, to bakeable, all-metal vacuum joints.

In many vacuum applications it is necessary for various reasons to bake the vacuum system components to high temperatures. This requirement makes it undesirable to use conventional non-metal seals (for example, those using rubber gaskets, greases, etc.) because at high temperatures they evolve large amounts of gas which can contaminate the vacuum system in addition to raising the system pressure. Therefore, completely metal vacuum joints (for example, copper O-ring seals, step and knife edge seals with copper gaskets, etc.) have come into use for many high vacuum applications. However, these prior all-metal vacuum seals have not been entirely reliable especially in applications requiring high temperature and/or frequent bake out.

It is, therefore, the object of this invention to provide an extremely reliable high vacuum seal which is highly bakeable, convenient to use and practical to manufacture.

One feature of the present invention is the provision of a sealing flange with a ridge portion having one slanted side adapted to make an acute angle with the surface of a soft metal gasket and wherein the flange is further provided with a shoulder portion having a side wall opposite the slanted ridge side.

Another feature of the present invention is the provision of a sealing flange of the above type wherein the slanted ridge side and the shoulder side wall are adapted to provide a compartment for trapping the soft gasket metal upon penetration of the gasket by the flange ridge portion.

Still another feature of the present invention is the provision of a flange seal of the above featured type wherein the acute angle formed by the slanted ridge side and the gasket surface is between 15–45°.

Another feature of the present invention is the provision of a sealing flange with a ridge portion having one slanted side which makes an acute angle with the flange surface and another vertical side which is substantially perpendicular to the flange surface.

Still another feature of the present invention is the provision of a flange seal of the above featured type wherein the acute angle formed by the slanted ridge side and the flange surface is between 15–45°.

Figure 1:
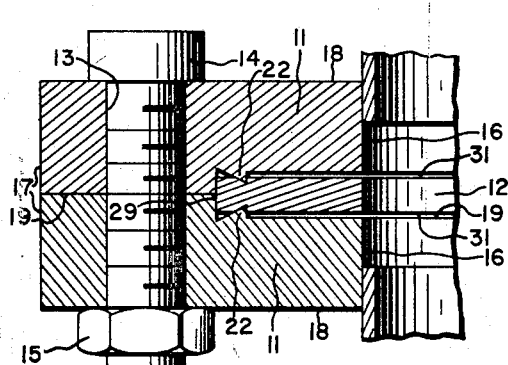
Figure 3:
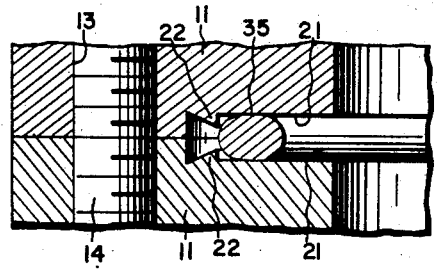
Figure 2:
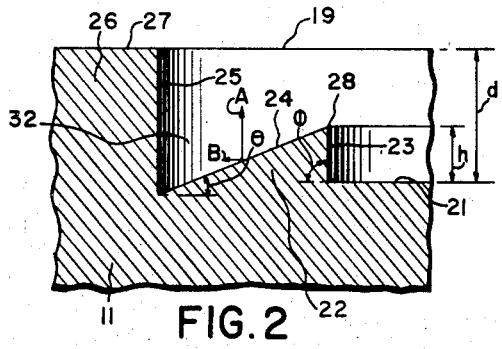
Figure 4:
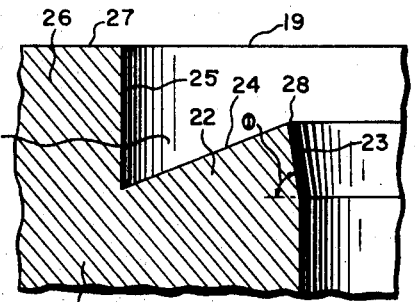
Figure 5:
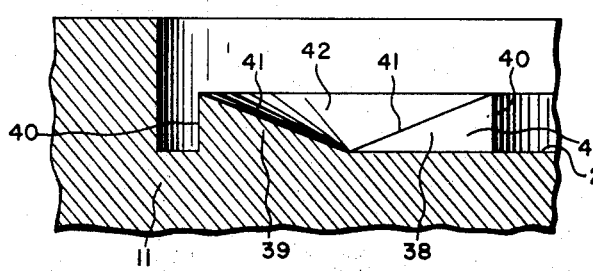
Figure 6:
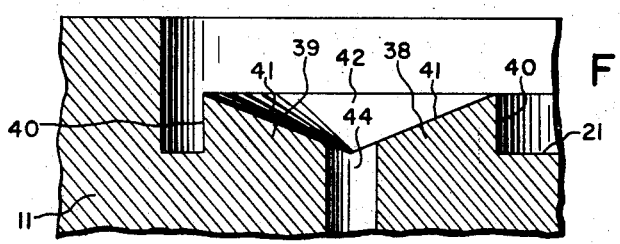

These and other advantages of the present invention will become more apparent after a perusal of the following specification taken in connection with the accompanying drawings wherein, FIG. 1 is a side sectional view of a portion of one vacuum joint embodiment of the present invention utilizing a flat soft metal gasket, FIG. 2 is an enlarged view of the sealing flange ridge portion shown in the embodiment of FIG. 1, FIG. 3 is a side sectional view of the vacuum seal embodiment of FIG. 1 utilizing a soft metal O-ring gasket, FIG. 4 is a greatly enlarged view of another sealing flange ridge embodiment of the present invention, FIG. 5 is an enlarged view of still another sealing flange ridge embodiment of the present invention, and FIG. 6 is an enlarged view of yet another flange embodiment of the present invention.

Referring now to FIG. 1, there is shown a pair of annular main flange members 11 made of, for example, stainless steel straddling an annular sealing gasket 12 made of, for example, copper and having a rectangular cross section. The flange members 11 are provided with a plurality of circumferentially arranged holes 13 which accommodate a plurality of bolts 14 made of, for example, stainless steel. Each of the bolts 14 has a nut 15 for providing a force to cause relative movement between the flange members 11 and the sealing gasket 12.

As shown in FIG. 1 and in FIG. 2, the annular flange members 11 have a generally rectangular cross section with smooth inner 16 and outer 17 edges and one flat side 18. The second side 19 of flange members 11 has a flat inner base portion 21 which is interrupted by a circular ridge portion 22. The ridge portion 22 has a triangular cross section with a vertical inner side 23 perpendicular to the flat base portion 21 and a slanted outer side 24 which forms an acute angle $\theta$ therewith. The slanted outer side 24 terminates on the inner side wall 25 of a shoulder 26 which forms the outer portion of the second side 19 of the flange member 11. The inner side wall 25 of shoulder 26 is perpendicular to the flat base 21 and the top surface 27 of shoulder 26 is parallel to the flat base 21 and somewhat further above it than the apex 28 of the ridge 22.

In the operation of the embodiment of FIG. 1 the inner edges 16 of the flange members 11 are secured by, for example, brazing to a pair of hollow vacuum system components (not shown) which it is desired to join for gas communication. The soft metal gasket 12 is positioned between the aligned and opposing ridge portions 22 of the adjacent flanges 11. The gasket 12 is of such a size that its outer edge 29 lies closely adjacent to the inner side walls 25 of shoulders 26 and its flat top and bottom surfaces 31 engage the ridge portions 22. The nuts 15 are then tightened on bolts 14 which results in a relative movement between the flange members 11 and the gasket member 12 in a direction perpendicular to the flat base surfaces 21.

The relative movement between the flange members 11 and gasket 12 causes a penetration of the gasket by the ridge portions 22. A normal force proportional to the total force applied by the bolts 14 then exists between the gasket 12 and the slanted outer sides 24 of the ridge portions 22. The normal force has a component A which is parallel to the direction of relative movement between the flanges 11 and gasket 12 and a component B which is perpendicular to this direction of relative movement. However, the soft metal gasket material is prevented from moving in the direction of component A by the slanted side 24 of the opposing ridge portion 22 and in the direction of component B by the inner side wall 25 of the shoulder 26.

Thus, the inner side wall 25 of the shoulder 26 and the slanted side 24 of the ridge portion 22 form a compartment 32 which traps the soft gasket material. The trapping of the gasket material results in the maintenance of an extremely high pressure in the area of contact between the gasket 12 and the slanted sides 24, even after repeated bakings.

For example, the flange seal embodiment of FIGS. 1 and 2 with the angle $\theta$ equal to 20°, the diameter of the ridge apex 28 equal to 1.520 in., the ridge height $h$ equal to .072 inch, the shoulder height $d$ equal to 0.10 inch, and an OFHC copper gasket about 0.125 inch thick was used in one successful test in which good seals were made and opened 21 consecutive times. The 21st seal was baked inbetween in consecutive baking cycles from room temperature to 500° C., 510° C., 465° C., 600° C., 760° C., and 525° C. without any evidence of a leak. An examination of the sealing gasket after this test indicated a penetration by each ridge portion 22 into the gasket of about .012 inch.

It has also been found that the sizes of the angle $\theta$ and the angle $\phi$ between the vertical inner side 23 of ridge portions 22 and the flat base surface 21 of flanges 11 have a large bearing on the type of seal obtained. For example, it is preferable that the vertical inner side 23 of ridge portion 21 be perpendicular to flat base portion 21. If the angle $\varphi$ is greater than 90°, the ridge portion 22 in this case, the total pressure applied by bolts, is mechanically weakened. On the other hand, if the angle $\phi$ is less than 90°, some of the pressure applied between the flange members 11 which was formerly available at slanted side 24 will now be exerted along the vertical side 23. This pressure would be less effective in making a seal because of the absence of a gasket trapping mechanism opposite vertical side 23. Also, it is more difficult to transmit the bolt force to the vertical side 23 than to slanted side 24 because of its greater distance from the bolts 14.

The preferable size of the angle $\theta$ has been found to be in the range between 15 and 45°. It appears that the amount of pressure which can be maintained between the gasket 12 and the slanted outer side 24 for given applied force between the flange members 11 is dependent upon the size of the angle $\theta$. It is believed that this unit pressure is in a maximum range for angles of $\theta$ between 15 and 45° with an apparent absolute maximum around 30°.

There are also other advantages for utilizing an angle of $\theta$ between 15–45°. For example, with angles of $\theta$ greater than 45° a great deal of difficulty is frequently encountered in separating the flanges after a seal has been made. This is apparently because the excessive pressure applied against the inner side 25 produces a welding effect between the gasket and flange. Also, as the angle $\theta$ becomes larger, the ridge portion 22 is mechanically weakened and a thicker gasket is required.

As the angle $\theta$ becomes exceedingly small, the trapping ability of the slanted sides 24 is lessened with the gasket material having a greater freedom of movement in a direction away from the shoulder walls 25.

As shown in FIG. 3, the sealing flange embodiment of FIG. 1 can also be used with O-ring gaskets. The soft metal O-ring 35 of circular cross section is positioned between the flat base portions 21 of adjacent flange members 11. As pressure is exerted between the flange member 11, a seal is made between the soft metal O-ring gasket 35 and the base portions 21.

FIG. 4 shows another sealing flange embodiment in which the flat base portion 21 of FIG. 2 is removed and the size of angle $\theta$ slightly reduced. This embodiment is useful in applications where a flange of reduced diameter is desired.

FIG. 5 shows a sealing flange 11 having a flat base portion 21 interrupted by an inner ridge portion 38 and an outer ridge portion 39, both of triangular cross section. Each ridge portion 38 has a vertical side 40 which is perpendicular to base portion 21 and a slanted side 41 which makes an acute angle with base portion 21. The slanted sides 41 meet at the base portion 21 to form a two-sided compartment 42. A slot 43 is provided all the way through the inner ridge 38 to the base portion 21.

The operation of the sealing flange embodiment of FIG. 5 is the same as that described for the apparatus of FIG. 1 except that in this case the trapping of soft metal gasket material takes place in compartment 42 between the slanted sides 41. The slot 43 provides a gas access path into the compartment 42 from the vacuum system (not shown). This prevents the establishment of a virtual leak between the vacuum system and the compartment 42 if a good seal is made with outer ridge 39 but not with inner ridge 38. However, this flange can also be made without the slot 43 in which case vacuum seals can be made by both inner ridge 38 and outer ridge 39.

FIG. 6 shows another sealing flange embodiment which is identical to that of FIG. 5 except that slot 43 is replaced by a gas access aperture 44 provided through the flange 11 to the bottom of compartment 42. In this embodiment a gas pumping apparatus can be connected to the aperture 44 to provide a vacuum in the compartment after it has been closed by a sealing gasket. By maintaining a vacuum in compartment 42, the possibility of a virtual gas leak through a faulty seal by inner ridge 38 is eliminated.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. A high vacuum joint comprising:
   a pair of spaced flange members adapted for movement along a longitudinal axis toward each other;
   said flange members having shoulder portions with inner walls substantially parallel to the longitudinal axis and facing surfaces directly opposite each other in confronting relationship intersecting said inner walls and adapted for contact to each other;
   a soft metal gasket positioned between said flange members and having an edge closely adjacent said inner walls;
   each of said flange members having a ridge portion projecting toward and contacting said gasket and being provided with a wall opposite said inner wall, sloping toward said inner wall at an acute angle between 45°–75° and forming a groove, said ridge portions being directly opposite each other in confronting relationship;
   said groove being adapted to receive the soft metal of said gasket upon penetration of said gasket by said ridge portions, the expected flow of the soft metal into said groove being less than the volume of said groove; and
   means for preventing extrusion of the soft metal from said groove and away from said sloping walls, said means comprising a continuous wall formed by said inner walls when said facing surfaces meet; whereby, upon movement of said flange members toward each other along the longitudinal axis, said gasket is penetrated by said ridge portions to cause flow of the soft metal toward said inner walls where it is restricted by said inner walls to create a seal of great pressure along said sloping walls.

2. The joint according to claim 1 wherein said ridge portions are substantially triangular in cross section, with a second side thereof being substantially parallel to the longitudinal axis and meeting said sloping side to form a corner.

3. A high vacuum joint according to claim 1 wherein said sealing gasket's dimensions in the direction of the longitudinal axis are only a small fraction of its dimensions in the direction perpendicular to the direction of the longitudinal axis.

References Cited by the Examiner

UNITED STATES PATENTS

| 448,765 | 3/91 | Kaiser | 285—349 |
|---|---|---|---|
| 2,257,213 | 9/41 | Wolfrom | 220—46 |
| 2,926,937 | 3/60 | Parsons | 285—350 |

FOREIGN PATENTS 6,730   3/14   Great Britain.

LEWIS J. LENNY, *Primary Examiner.*

WILLIAM FELDMAN, EDWARD V. BENHAM,
*Examiners.*